United States Patent
Grundhoefer et al.

(10) Patent No.: US 12,073,533 B1
(45) Date of Patent: Aug. 27, 2024

(54) DETECTING SPECULAR SURFACES

(71) Applicant: Apple Inc., Cupertino, CA (US)

(72) Inventors: Anselm Grundhoefer, Campbell, CA (US); Mohamed Selim Ben Himane, Milpitas, CA (US); Daniel Kurz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/820,442

(22) Filed: Aug. 17, 2022

Related U.S. Application Data

(60) Provisional application No. 63/240,427, filed on Sep. 3, 2021.

(51) Int. Cl.
*G06T 3/60* (2024.01)
*G06V 10/60* (2022.01)

(52) U.S. Cl.
CPC ............... *G06T 3/60* (2013.01); *G06V 10/60* (2022.01); *G06T 2207/30244* (2013.01)

(58) Field of Classification Search
None
See application file for complete search history.

(56) References Cited

U.S. PATENT DOCUMENTS

| | | | |
|---|---|---|---|
| 2012/0320095 A1* | 12/2012 | Boghossian | H04N 7/188 345/661 |
| 2014/0270344 A1* | 9/2014 | Krishnamoorthi | G06V 10/40 382/103 |
| 2015/0095360 A1* | 4/2015 | Vrcelj | G06F 18/24143 707/758 |
| 2015/0363654 A1* | 12/2015 | Zhao | G06T 7/68 382/104 |
| 2017/0206691 A1* | 7/2017 | Harrises | G02B 27/0172 |
| 2019/0325595 A1* | 10/2019 | Stein | G06V 10/764 |
| 2021/0064910 A1* | 3/2021 | Meier | G06V 40/171 |
| 2021/0132201 A1* | 5/2021 | Voynov | G01S 7/497 |

* cited by examiner

*Primary Examiner* — Anh-Tuan V Nguyen
(74) *Attorney, Agent, or Firm* — Blank Rome LLP

(57) ABSTRACT

Identifying a specular surface, such as a mirror, in a captured scene includes extracting, from one or more images of the scene, a set of natural features and generating, from the image, a set of synthesized "mirrored" features. One or more correspondences may be determined between the set of natural features in the image and the set of synthesized mirrored features. A first set of features are identified based on the determined one or more correspondences as representing a specular surface (e.g., a mirror) located in the scene, and then a geometry and/or location of the specular surface within the scene may be determined. For example, in some embodiments, the feature from a determined pair of corresponding features in a scene that is determined to be farther away from the device that captured the image(s) of the scene may be determined to be the feature lying on the specular surface.

14 Claims, 6 Drawing Sheets

DETECTING SPECULAR SURFACES

BACKGROUND

This disclosure relates generally to image processing. More particularly, but not by way of limitation, this disclosure relates to techniques and systems for identifying a "specular surface" in a captured scene, i.e., a surface that exhibits a specular reflection. A specular reflection is a type of surface reflectance often described as a "mirror-like" reflection of light from the surface of an object and, indeed, a mirror is an example of a specular surface that is commonly found in captured scenes. Specular reflection may be further characterized as a reflection in which an incident light ray is reflected in a single outgoing direction (i.e., as contradistinguished from diffuse reflection, wherein incident light rays may be scattered in many different directions). In some instances, surfaces with materials whose specular reflection coefficient is higher than its diffuse reflection coefficient may be considered to be specular surfaces.

Light reflects off a specular surface in a captured scene (e.g., a mirror, polished metal, glass, plastic, or the surface of a body of water or other transparent liquid) according to the law of reflection, i.e., wherein the angle of incidence of a light ray is equal to its angle of reflection. In some embodiments described herein, the specular surfaces in a scene may be identified based, at least in part, on determined feature correspondences within the captured scene.

Computer vision often relies upon the identification of "features" in an image of a captured scene. An image feature can be defined in many ways, depending on the context and particular use case. For example, an image feature may comprise a position, set of positions, and, optionally, dimensions and/or orientations of a pixel or group of pixels in an image. According to some examples, an image feature may comprise a point, a line, a circle, an ellipse, a "keypoint" with a size and orientation, or the like, within the image. An image feature may correspond to particular image content of interest, e.g. the position of corners, edges, extrema, blobs of particular pixels of interest, and the like.

In order to compare identified image features to one another (e.g., in order to establish correspondences between different features), feature descriptors may be computed for the identified image features. Feature descriptors may comprise: an image patch of pixels located around a respective feature in an image; an average intensity of image pixels in the neighborhood of the respective feature; or any other defined characteristic that may be used to describe the image feature in a distinctive way. In some cases, a feature descriptor may not use any image pixel intensities at all—but may instead be based on the spatial configuration of other features in the image with respect to a given feature. In still other cases, trained neural networks, such as Deep Neural Networks (DNNs) may be used to compute feature descriptors. Examples of commonly used feature descriptors in computer vision applications may include scale invariant feature transform (SIFT), speed up robust feature (SURF), robust independent elementary features (BRIEF), oriented FAST, rotated BRIEF (ORB), and fast retina keypoint (FREAK).

Computer vision techniques are often employed when a user is viewing a captured scene on a display of a device. One challenge of computer vision is determining where specular surfaces exist in a scene. For example, without the benefit of the techniques to be disclosed herein, a specular surface, such as a mirror, in a scene may incorrectly be detected as an opening in a wall, such as a window or doorway. Accordingly, what is needed is an improved technique for detecting specular surfaces in a scene.

DETAILED DESCRIPTION

Figure 1:
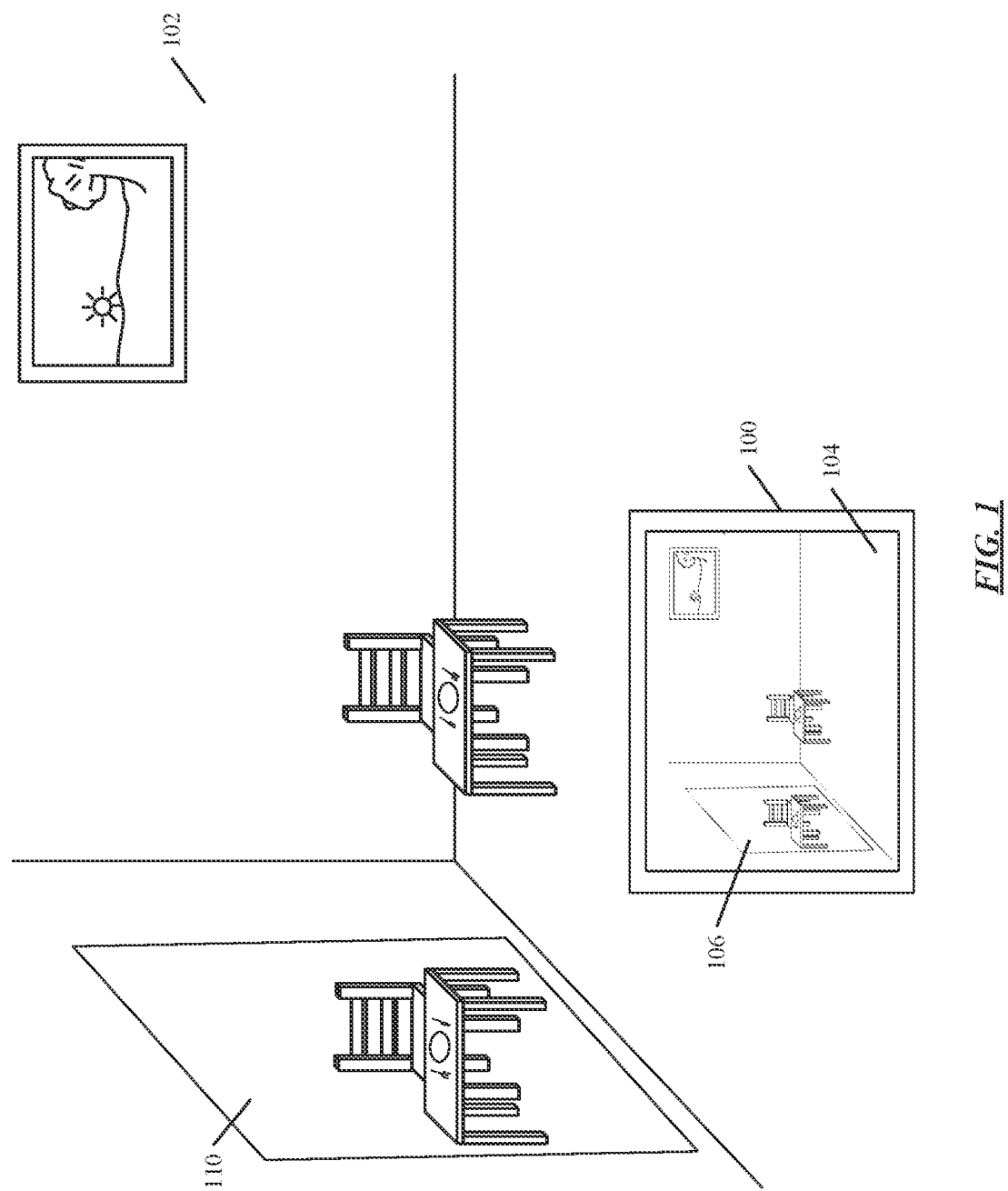
FIG. 1 shows an example of a scene and a view of the scene on a display of a device, according to one or more embodiments.

This disclosure pertains to systems, methods, and computer-readable media to improve the detection of specular surfaces, e.g., mirrors, in captured scenes using computer vision techniques. Generally, one or more images of a scene are obtained. A set of so-called "natural" features is extracted from the image (or images), and a set of so-called "synthesized mirrored" features is then generated, which correspond to a mirrored version of the extracted natural features. For example, the image, or portions of the image (such as groups of pixels corresponding to extracted features) may be synthesized to generate mirrored versions of the features obtained from the scene. Then, the natural features and the synthesized mirrored features may be compared to determine one or more correspondences. The determined one or more correspondences may indicate that a specular surface, such as a mirror, is present in a scene.

In some scenes, two sets of features may be identified as being mirrored features. For example, a single image of a physical environment may include a mirrored or otherwise specular surface. The portion of the environment that is reflected on the specular surface may appear in the image as a set of natural features and mirrored features, corresponding to the natural features. In order to identify that the natural features correspond to the mirrored features, synthesized mirrored features may be generated from the natural features in the image (e.g., the features in the image, whether or not they lie on a specular surface). Then, the synthesized mirrored features may be compared to the features in the image to identify the mirrored features.

For example, a feature that corresponds to an edge of a surface in the environment may be synthesized to generate a synthesized mirrored feature. By comparing the synthesized mirrored feature to features in the image (for example, through feature matching techniques), the synthesized mirrored feature corresponding to the edge of the surface will match a feature in the image of the reflection of the edge as it appears on the specular surface. In some embodiments, the set of features that appears farther from the perspective of the image pose may be determined to be the set of features that lies on the specular surface. For instance, returning to the example of the surface edge appearing in the physical environment, the representation of the edge on the specular surface in the image will appear further from the camera than the edge that is not visible on the specular surface in the image because of the nature of the reflectance on the specular surface. Said another way, the reflected representation of the edge will appear smaller than the actual representation of the edge in the image.

In some embodiments, a user may be provided with an indication as to the geometry of a mirror (or other specular surface) in the physical environment captured in the image. For example, the features determined to be in the specular surface may be input into a semantic segmentation model along with the one or more images to determine a geometry of the mirror. The user may be provided with an indication of the geometry of the specular surface in the environment. For example, a user viewing the scene on a display of an electronic device may be warned that a mirror is in the scene, such as by providing a visual indication of a geometric boundary of the specular surface of the mirror. According to one or more embodiments, by doing so, a user may be better able to determine whether an object in front of them is a real world object or a reflection of a real world object.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time-consuming but would nevertheless be a routine undertaking for those of ordinary skill in the design and implementation of graphics modeling systems having the benefit of this disclosure.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring to FIG. 1, an example diagram of a view of a captured scene, e.g., as viewed via a display of an electronic device, is depicted. Electronic device 100 may be part of a multifunctional device, such as a mobile phone, tablet computer, personal digital assistant, portable music/video player, wearable device, base station, laptop computer, desktop computer, network device, or any other electronic device. In some embodiments, electronic device 100 may include a display 104 through which a scene 102 may be viewed. In some embodiments, the display may be a pass-through display, an opaque display, or the like. As such, the view of the scene 102 may be a natural view or a projected view.

As will be described in greater detail below, electronic device 100 can use computer vision techniques to provide a user experience in conjunction with the viewing of a representation of the scene 102. In some embodiments, the electronic device 100 may be configured to detect specular surfaces within the scene 102, such as mirror 110, and may prompt a user of electronic device 100 accordingly. For example, a user may view the scene 102 using the electronic device 100 and be prompted that the scene includes a specular surface 106. By doing so, the user may be better aware that the representation of objects on the surface of mirror 110 in the scene 102 is actually a reflection of the scene and does not include additional real world objects. For example, a user may confuse a mirror in a scene for an opening in a wall, and may unintentionally attempt to walk through the mirror, interact with a reflection of a real object rather than the real object, or the like. By providing an indication of the geometry of the mirror (or other specular surface) in the scene to a user, the user is provided with additional context of the environment. This additional context may enhance the user's ability to navigate the environment, and/or may provide a technical improvement to the process of distinguishing between real world objects and reflections of real world objects in a scene using computer vision.

Figure 2:
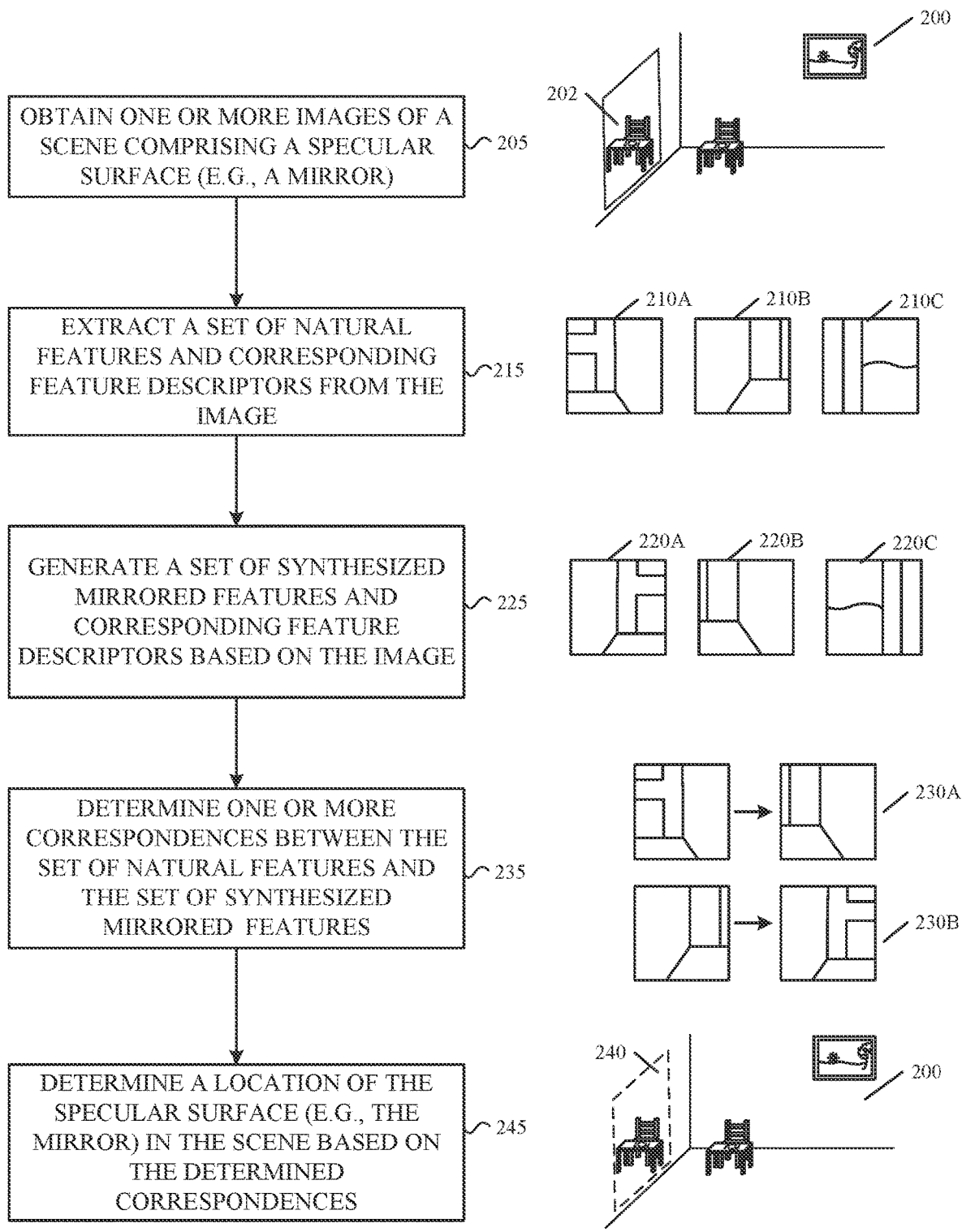
FIG. 2 shows a flowchart in which a specular surface is identified in a scene, according to one or more embodiments.

Referring to FIG. 2, a flowchart is illustrated in which a specular surface is identified in a scene, according to one or more embodiments. Although the various processes depicted in FIG. 2 are illustrated in a particular order, it should be understood that the various processes may be performed in a different order. Further, not all the processes may be necessary to perform. For purposes of explanation, the various processes will be described in the context of the particular components of particular devices; however, it should be understood that the various processes may be performed by additional or alternative components or devices.

The flowchart begins at 205, where one or more images of a scene 200 comprising a mirror 202 or other specular surface is obtained. The image may be captured by one or more cameras of an electronic device, such as electronic device 100 of FIG. 1. According to one or more embodiments, a single image of the scene may be captured. In other embodiments, multiple images of a scene may be captured. For example, multiple images of different views of the scene may be captured as a user of the electronic device moves through the scene.

The flowchart continues at 215 where a set of natural features is extracted from the scene. As shown, example features 210A, 210B, and 210C represent a subset of features extracted from the captured scene. The set of so-called "natural" features extracted from the captured images of the scene comprise features that do not lie on a specular surface. In some embodiments, the natural features may also include features corresponding to mirrored features, that is, features lying on a specular surface in the scene that correspond to a real object elsewhere in the scene. The natural features can be obtained in a number of ways, such as by applying a feature detector to the image. The feature detector may identify the individual features, e.g., the points of interest in an image.

At block 225, a set of synthesized mirrored features (and corresponding feature descriptors) may be generated based on the image. The synthesized mirrored features can be generated in a number of ways, as will be described in greater detail below with respect to FIG. 3. For example, the image may be flipped along an axis, and a feature detector may be applied to identify features in the flipped image, thereby obtaining synthesized mirrored features. As another example, patches in the image that include a pixel neighborhood for each of the natural features, such as those depicted in 210A, 210B, and 210C, can be flipped along an axis to generate a synthesized mirrored patch, corresponding to the synthesized mirrored features. The resulting synthesized mirrored patches are shown as 220A, 220B, and 220C, where 220A depicts a flipped version of 210A, 220B depicts a flipped version of 210B, and 220C depicts a flipped version of 210C. As another example, feature descriptors may be obtained for each feature of the set of natural features, and the feature descriptors may be mirrored. For example, a feature descriptor may comprise a vector in the form of a set of bins, with each corresponding to unique spatial characteristics of the respective feature. The contents of those bins may then be flipped to obtain a mirrored feature descriptor that corresponds to a mirrored version of a given feature.

The flowchart continues at block 235, where one or more correspondences are determined between the set of natural features and the set of synthesized mirrored features. The correspondences may be determined, for example, using a nearest neighbor search based on descriptors for each of the features. The feature descriptors used in a given implementation may be scale invariant, such as when using Scale-Invariant Feature Transform ("SIFT"), Speeded-Up Robust Features ("SURF"), or Fast Retina Keypoint ("FREAK") feature matching algorithms. As such, correspondences may be found at different scales, as may be the case when one feature lies on a mirror surface and the corresponding feature in the captured image does not. As an example, correspondence 230A shows feature 210A is a naturally occurring feature from the image and can be found to correspond to synthesized feature 220B, which is the reflected version of natural feature 210B. For example, synthesized feature 220B may represent a feature that matches feature 210A but at a different scale (e.g., synthesized feature 220B may represent a more 'zoomed in' version of a portion of feature 210A). In addition, correspondence 230B shows feature 210B is a naturally occurring feature from the image and can be found to correspond to synthesized feature 220A, which is the reflected version of natural feature 210A. For example, synthesized feature 220A may represent a feature that matches feature 210B but at a different scale (e.g., synthesized feature 220A may represent a more 'zoomed in' version of a portion of feature 210B).

The flowchart concludes at block 245, where a location of the specular surface (e.g., mirror) in the captured scene is determined based on the determined one or more correspondences. In one or more embodiments, a determination may be made from among the natural features (e.g., 210A and 210B) and their correspondences as to which features lie on the mirror in the image 200, as will be described below. In general, each feature with a corresponding mirrored feature in the image will be associated with two feature matches: one match with the natural feature not on the specular surface (as it is matched to the synthesized mirrored feature based on the feature that lies on the specular surface); and the second match for the natural feature on the specular surface (as it is matched to the synthesized mirrored feature based on the feature that does not lie on the specular surface). For example, the natural feature of the two matching features that appears farther away based on the current pose of the electronic device (e.g., 210A) may be considered to be the feature lying on the specular surface. Said another way, the feature appearing to be at a smaller scale may be considered to be the point lying on the specular surface in the scene. In some embodiments, the determined location of the mirror 240 may be presented to the user or otherwise used to prompt the user of electronic device about the location of the mirror 240 in the scene 200.

Figure 3:
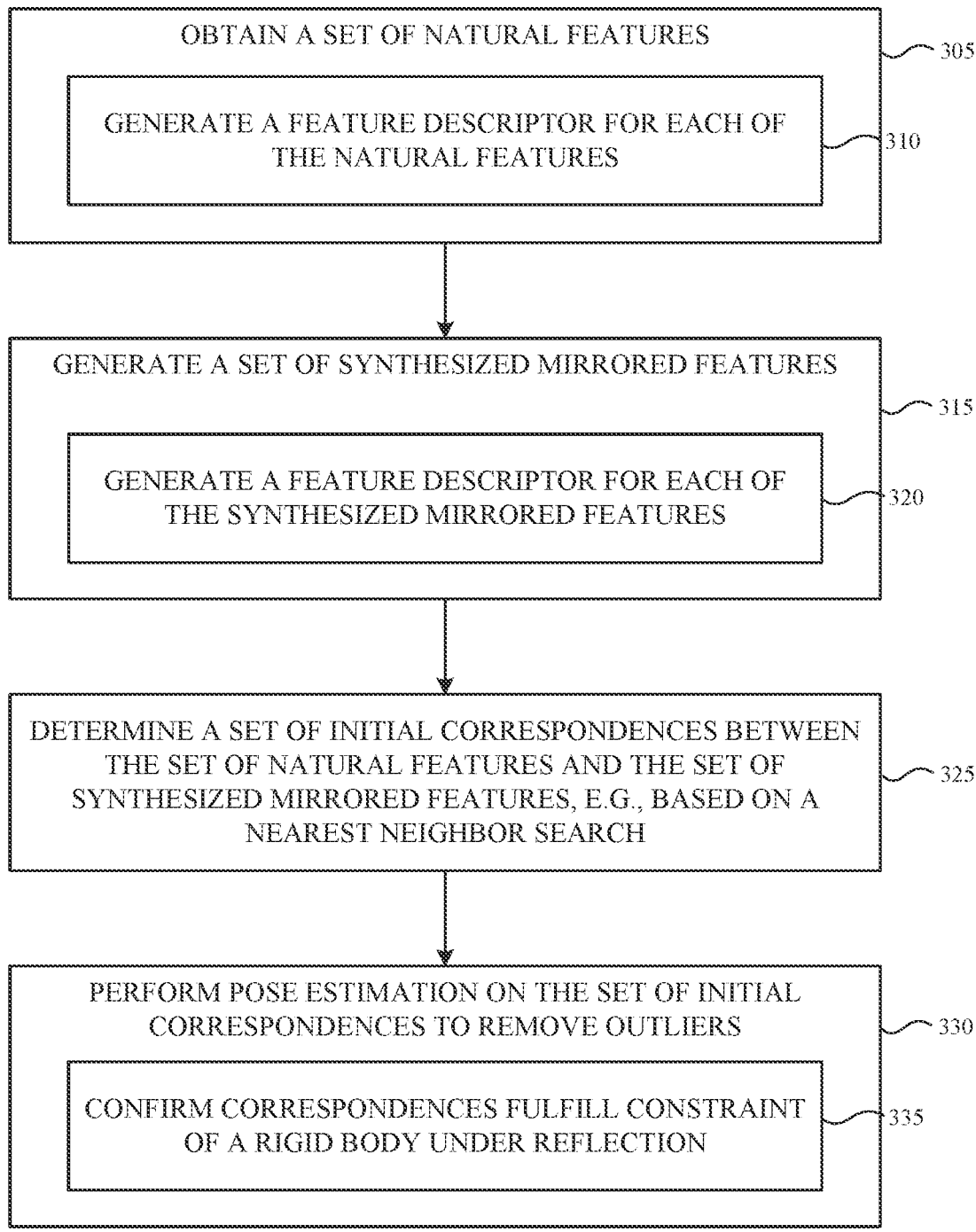
FIG. 3 shows a flowchart in which correspondences are identified between natural image features and synthesized mirrored image features, according to one or more embodiments.

FIG. 3 shows a flowchart in which correspondences are identified among natural features and synthesized mirrored features, according to one or more embodiments. Specifically, FIG. 3 depicts variations and additional details related to the flowchart described above with respect to FIG. 2. Although the various processes depicted in FIG. 3 are illustrated in a particular order, it should be understood that the various processes may be performed in a different order. Further, not all the processes may be necessary to perform. For purposes of explanation, the various processes will be described in the context of the particular components of particular devices; however, it should be understood that the various processes may be performed by additional or alternative components or devices.

The flowchart begins at 305, where a set of natural features are obtained from one or more images of a scene. For example, the set of natural features may be obtained from any desired form of feature detector. In some embodiments, the features may be 2D points or 3D points. Further, the features may be identified in a point cloud associated with an environment in the scene, and/or a map, such as a SLAM map, in which features are stored. As shown at block 310, in some embodiments, feature descriptors may be generated for each of the features of the set of natural features. According to some embodiments, the feature descriptors may be scale-invariant descriptors and/or rotation-invariant descriptors.

The flowchart continues at block 315, where a set of synthesized mirrored features are generated. The set of synthesized mirrored features may be generated in a number of ways. For example, the image may be flipped along an axis, and a feature detector may be applied to identify the mirrored features. As an example, a feature detector may be applied to the flipped version of the image to identify the synthesized mirrored features. As another example, patches that include a pixel neighborhood for each of the natural features may be flipped around an axis. As shown at block 320, feature descriptors may be obtained for each of the set of synthesized mirrored features and/or may be determined without generating the set of features. Said another way, mirrored feature descriptors may be obtained without generating synthesized mirrored features, according to some embodiments. In some embodiments, the feature descriptors may be mirrored based on spatial bins within the descriptor. For example, the spatial bins may be flipped to obtain a mirrored descriptor that corresponds to a mirrored version of a given feature.

The flowchart continues at block 325, where a set of initial correspondences is determined between the set of natural features and the set of synthesized mirrored features. In some embodiments, the correspondences may be established within a single image. In other embodiments, multiple images of the scene may be utilized to establish the correspondences. For example, features and/or feature descriptors may be obtained from multiple images capturing a scene including a specular surface and utilized to identify correspondences among the larger group of features identified across the set of multiple images. In some embodiments, the correspondences may be determined based on 2D-2D correspondences or 3D-3D correspondences. In the example of the 2D-2D correspondences, feature descriptors may be used to perform a search, e.g., a nearest neighbor search. In the example of 3D-3D correspondences, geometric features of the feature may be utilized, such as within a map or a point cloud. For example, in some embodiments, a similarity metric may be utilized to determine whether two features are substantially similar.

The flowchart concludes at 330, where pose estimation is performed on the set of initial correspondences to remove "outlier" features. In some embodiments the camera(s) that take the image(s) of the scene are calibrated, e.g., based on an estimate of each camera's intrinsic parameters, such as focal length and principal point. Pose estimation may be performed in a number of ways, e.g., depending on whether the correspondences are 2D-2D correspondences, 2D-3D correspondences, or 3D-3D correspondences. In all cases, a mathematical model (e.g., a pose, a rigid body transform, a fundamental matrix, an essential matrix, etc.) may be estimated that correlates the coordinates from the first set of features to the coordinates of the second set of features. All correspondences between the first and the second set of features that agree with this estimated mathematical model (e.g., within a similarity threshold) may be considered to be "inlier" correspondences. All correspondences that disagree with this model (e.g., by more than the similarity threshold) may be considered to be outlier correspondences. In one embodiment, features that are determined to comprise at least one outlier correspondence may be considered to be outlier features, while other features may be considered inlier features. In another embodiment, features that are comprised only of outlier correspondences (i.e., and no inlier correspondences) may be considered outlier features, while other features may be considered inlier features. In some embodiments, the specular surface may be planar (or nearly planar) and, therefore, its geometrical optics may be approximated and modeled as a planar mirror.

Different potential use case scenarios will now be discussed in greater detail. For example, in some cases, there may only be a single image of a scene without any depth information. In such cases, all natural features extracted from the single image, as well as all synthesized mirrored features from the single image will only have known 2D image coordinates, i.e., there will be no known 3D coordinates for the features. Matching such features will lead to a set of 2D-2D correspondences between natural features and synthesized mirrored features. In this case, if there is a specular surface and a planar surface in the scene, then what the camera observes on the specular surface is geometrically identical to how the reflected scene would appear from a second camera, i.e., a second camera positioned at the actual single camera's position but mirrored on the plane of the specular surface. This makes the problem conceptually a multi-view problem with two camera positions, and standard pose estimation algorithms may be applied to estimate the fundamental matrix (or the essential matrix) between the two cameras based on the set of 2D-2D correspondences.

In other cases, one or more images of the scene may be captured. In cases where more than one image has been captured, the relative pose between the images may be estimated. Further, an estimated depth value (e.g., in the form of 3D coordinates) may then be obtained for at least a subset of the features in the image(s) resulting from, e.g., monocular depth estimation, additional information from a depth-sensing camera, structure-from-motion (SfM) techniques, simultaneous localization and mapping (SLAM), or other methods. Matching such features that have known 3D coordinates with their set of synthesized mirrored features leads to a set of 3D-3D correspondences. Since the 3D coordinates of the synthesized mirrored features are flipped along one axis in 3D in this case, this becomes a regular pose estimation problem from 3D-3D correspondences, which can be solved with known pose estimation methods.

In still other cases, features from some images may have estimated 3D coordinates, while features from other images may not. In such cases, matching a set of 2D features from one image against synthesized mirrored versions of a set of 3D features resulting from one or more other images leads to a set of 2D-3D correspondences. Due to the fact that the 3D coordinates of the synthesized mirrored features are flipped along one axis in 3D in this case, the pose estimation problem becomes a regular Perspective-n-Point (PnP) pose estimation problem, which can also be solved with known pose estimation methods In some embodiments, the pose estimation may also comprise removing any outlier features (i.e., features not actually a part of an identified specular surface in the scene) using a technique such as random sample consensus ("RANSAC"). As shown at block 335, the pose estimation may be performed to confirm correspondences fulfill the constraint of a rigid body under reflection. In some embodiments, the set of initial correspondences may be reduced to remove correspondences that do not fulfill the constraints of a rigid body under reflection.

Figure 4:
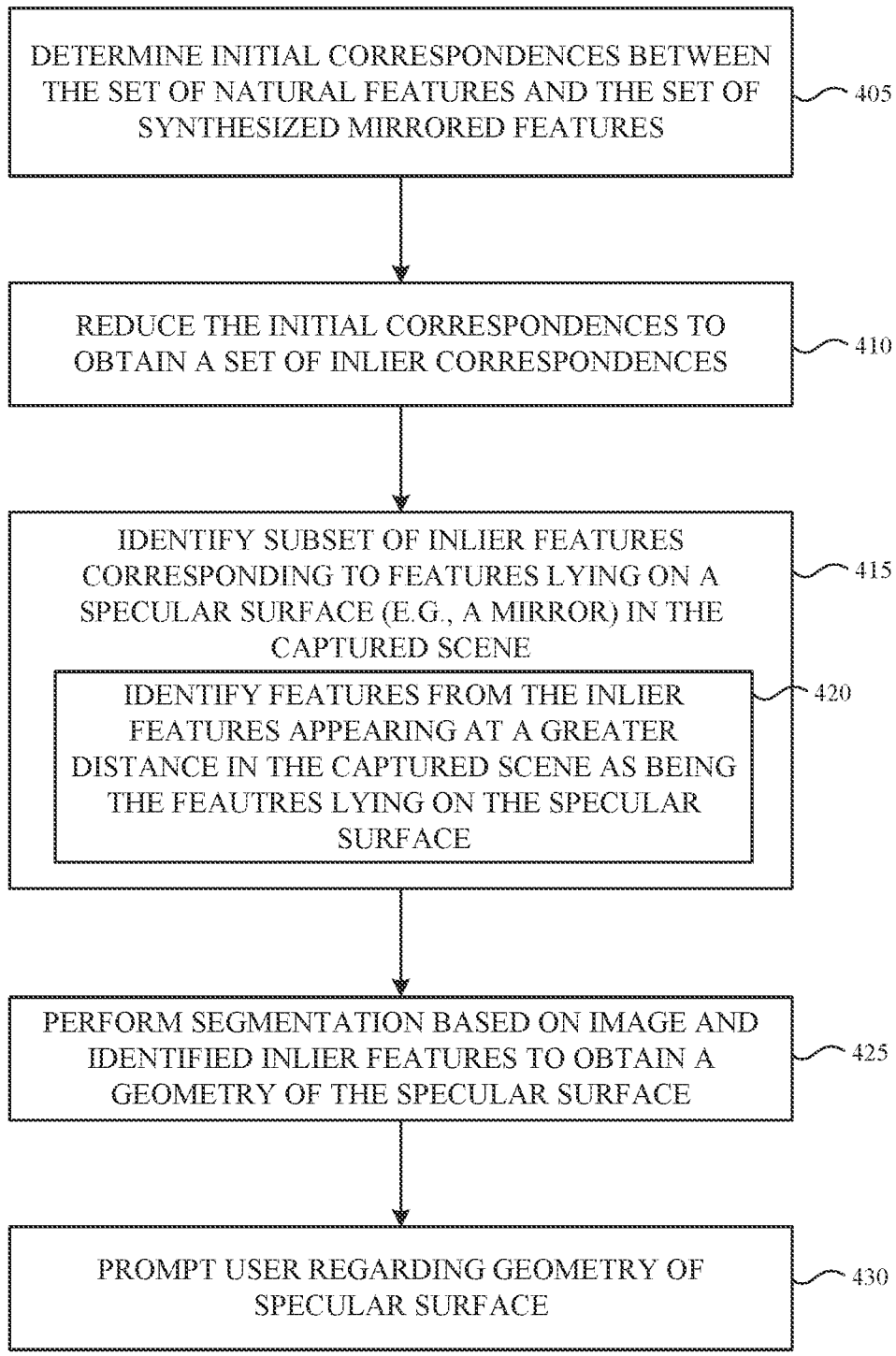
FIG. 4 shows a flowchart of a technique for determining a geometry of a specular surface in a scene, in accordance with one or more additional embodiments.

FIG. 4 shows a flowchart of a technique for determining a geometry of a specular surface (e.g., a mirror) in a captured scene, in accordance with one or more additional embodiments. Specifically, FIG. 4 depicts variations and additional details related to the flowchart described above with respect to FIG. 2. Although the various processes depicted in FIG. 4 are illustrated in a particular order, it should be understood that the various processes may be performed in a different order. Further, not all the processes may be necessary to perform. For purposes of explanation, the various processes will be described in the context of the particular components of particular devices; however, it should be understood that the various processes may be performed by additional or alternative components or devices.

The flowchart begins at block 405, where the system determines initial correspondences between the set of natural features and the set of synthesized mirror features. The correspondences may be determined in a number of ways, as described above with respect to block 325 of FIG. 3. Then, at block 410, the initial correspondences are reduced to obtain a set of inlier correspondences (i.e., a set of correspondences that has removed any determined outlier correspondences). As described above, the initial correspondences may be reduced based on pose estimation, RANSAC techniques, outlier detection techniques, or the like.

The flowchart continues at block 415, where a subset of inlier features are identified (based, at least in part, on identifying image features comprising the obtained set of inlier correspondences) that correspond to features lying on the specular surface (e.g., a mirror) in the image. That is, as described above, two sets of features will be identified per specular surface: 1) the natural features from the image that are not on a specular surface and the corresponding synthesized mirrored features generated from features lying on the mirror; and 2) the natural features from the image that are on a specular surface and the corresponding synthesized mirrored features generated from features not lying on the mirror but for which a reflection in the mirror exists. That is, two subsets of natural features are identified, which correspond to a portion of the scene and a reflection of a portion of the scene in a mirror in the scene. The subset of features lying on the mirror or other specular surface may be identified by comparing characteristics of the two subsets of natural features. As shown at block 420, the subset of features that appear at a greater distance in the captured scene (e.g., based on having a smaller size than their corresponding feature) may be determined to be the subset of features that lie on the specular surface.

The flowchart continues at block 425, where a segmentation technique is performed to determine or refine a geometry of the mirror or specular surface in the scene. In one or more embodiments, an initial location of the mirror may be determined based on location information for the subset of features identified above at block 415. In some embodiments, semantic segmentation may be performed on one or more images of the scene using the identified subset of features from 415 as input. In one or more embodiments, the geometry of the mirror may include a shape of the mirror, a plane of the mirror, a location of the mirror, and the like.

The flowchart concludes at block 430, where a user is prompted regarding the geometry of the specular surface (e.g., mirror) identified in the scene. For example, an outline of the geometry may be presented to the user so that the user is made aware that the specular surface is present in the scene. As another example, an audio or visual prompt may warn a user if the user is approaching a mirror. By doing so, a user is warned and may be prevented from bumping into a mirror or other specular surface appearing in the scene, which may otherwise be difficult to detect using prior computer vision techniques.

Figure 5:
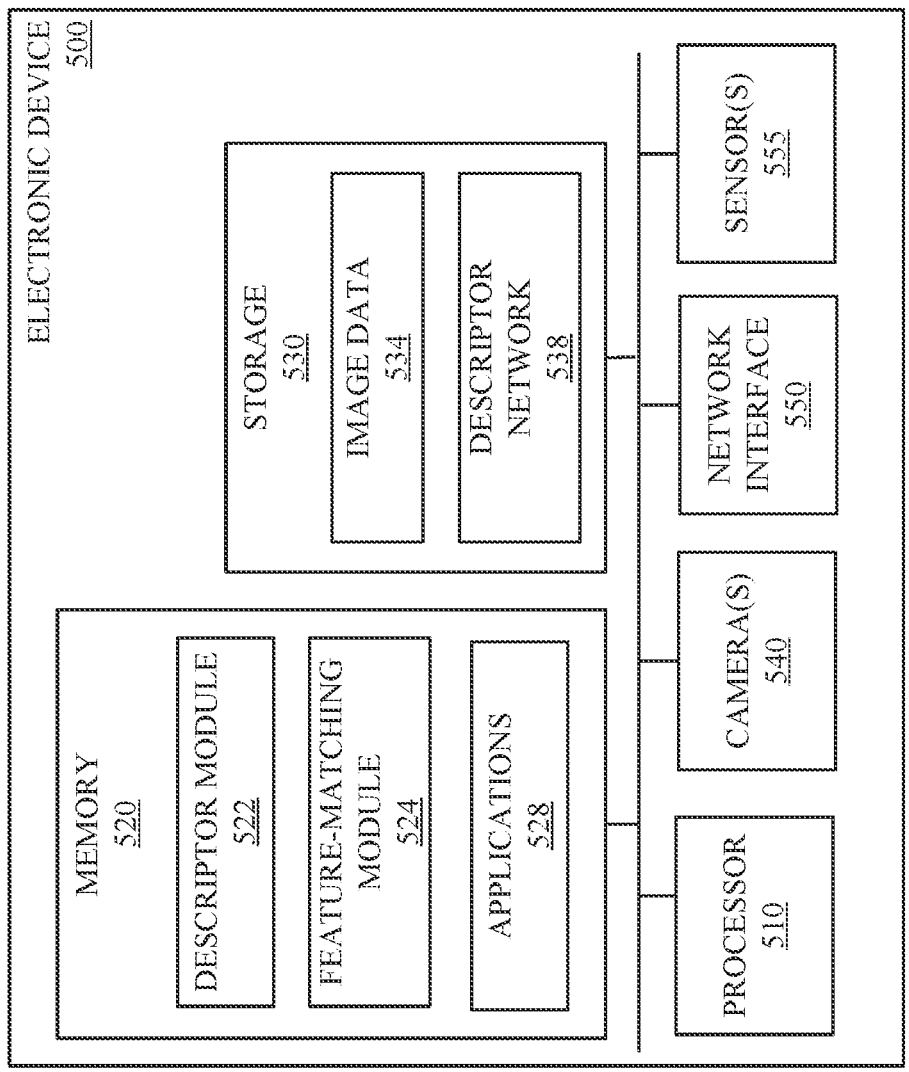
FIG. 5 shows, in block diagram form, a simplified system diagram for identifying specular surfaces in a scene, according to one or more embodiments.

Referring to FIG. 5, a simplified block diagram of an electronic device 500 is depicted, in accordance with one or more embodiments. Electronic device 500 may be part of a multifunctional device, such as a mobile phone, tablet computer, personal digital assistant, portable music/video player, wearable device, base station, laptop computer, desktop computer, network device, or any other electronic device. Further, according to one or more embodiments, the various components presented in electronic device 500 may be distributed across one or more connected electronic devices. Electronic device 500 may additionally include one or more other network devices within which the various functionality may be contained or across which the various functionality may be distributed. Illustrative networks include, but are not limited to, a local network such as a universal serial bus (USB) network, an organization's local area network, and a wide area network such as the Internet. According to one or more embodiments, electronic device 500 is utilized to detect specular surfaces in a scene.

Electronic device 500 may include components similar to those described above with respect to electronic device 100 of FIG. 1. Specifically, electronic device 500 may include components with characteristics similar to those described above with respect to electronic device 100, including one or more processors 510, memory devices 520, camera 540, network interface 550, and sensor(s) 555.

As described above, memory 520 may store various programming modules for execution by processor 510, including descriptor module 522, feature-matching module 524, as well as other applications 528. In one or more embodiments, descriptor module 522 may be configured to obtain one or more images of a scene and identify features in the images. Further, descriptor module 522 may take the features and determine feature descriptors that describe, e.g., the intensity, geometry, location, or other characteristics of the identified features. According to one or more embodiments, the feature-matching module 524 may use a descriptor network 538, which may have been pretrained to generate descriptors for the features identified in the one or more images.

Feature-matching module 524 may be configured to compare sets of features to identify correspondences. For example, sets of identified features may be matched across different images (as in the case of image registration algorithms) or among features identified (and/or synthesized) from a single image. In some embodiments, feature-matching module 524 may be configured to take a set of natural features from an image of a scene and a set of synthesized mirrored features generated from the image of the scene and identify correspondences therebetween, from which a determination may be made that the scene captured in the one or more images includes a mirror or other specular surface.

Electronic device 500 may also include one or more camera(s) 540 and/or other sensors 555. In one or more embodiments, at least one of the one or more cameras may be a traditional RGB camera. Further, cameras may include a stereo camera or other multicamera system, a time-of-flight camera system, or the like. Camera(s) 540 may include a lens assembly, as well as a sensor, and other circuitry which may be utilized together to capture RGB images, and/or RGB-D images (i.e., RGB images with corresponding depth information). Sensors 555 may include a depth sensor, time-of-flight sensor, ambient light sensor, and the like.

Storage 530 may be utilized to store various data and structures which may be utilized for providing a technique for providing classification information for an image. Storage 530 may include, for example, natural image data 534, such as the images of the scene which are analyzed for determining whether the scene includes a specular surface and the aforementioned descriptor network 538. Natural image data 534 may include, for example, images that are captured by camera(s) 540.

Although the various components described within memory 520 and storage 530 are depicted as within a single device, it should be understood that the various components or data within the components may be distributed across multiple storage devices or even across multiple electronic devices, for example, across a network. Similarly, although electronic device 500 is depicted as comprising the numerous components described above, in one or more embodiments, the various components may be distributed across multiple devices. Accordingly, although certain functions are described herein with respect to the particular systems as depicted, in one or more embodiments, the functions may be differently directed based on nature by which the systems are distributed in a networked environment. Further, additional components may be used, and some combination of the functionality of any of the components may be combined.

Figure 6:
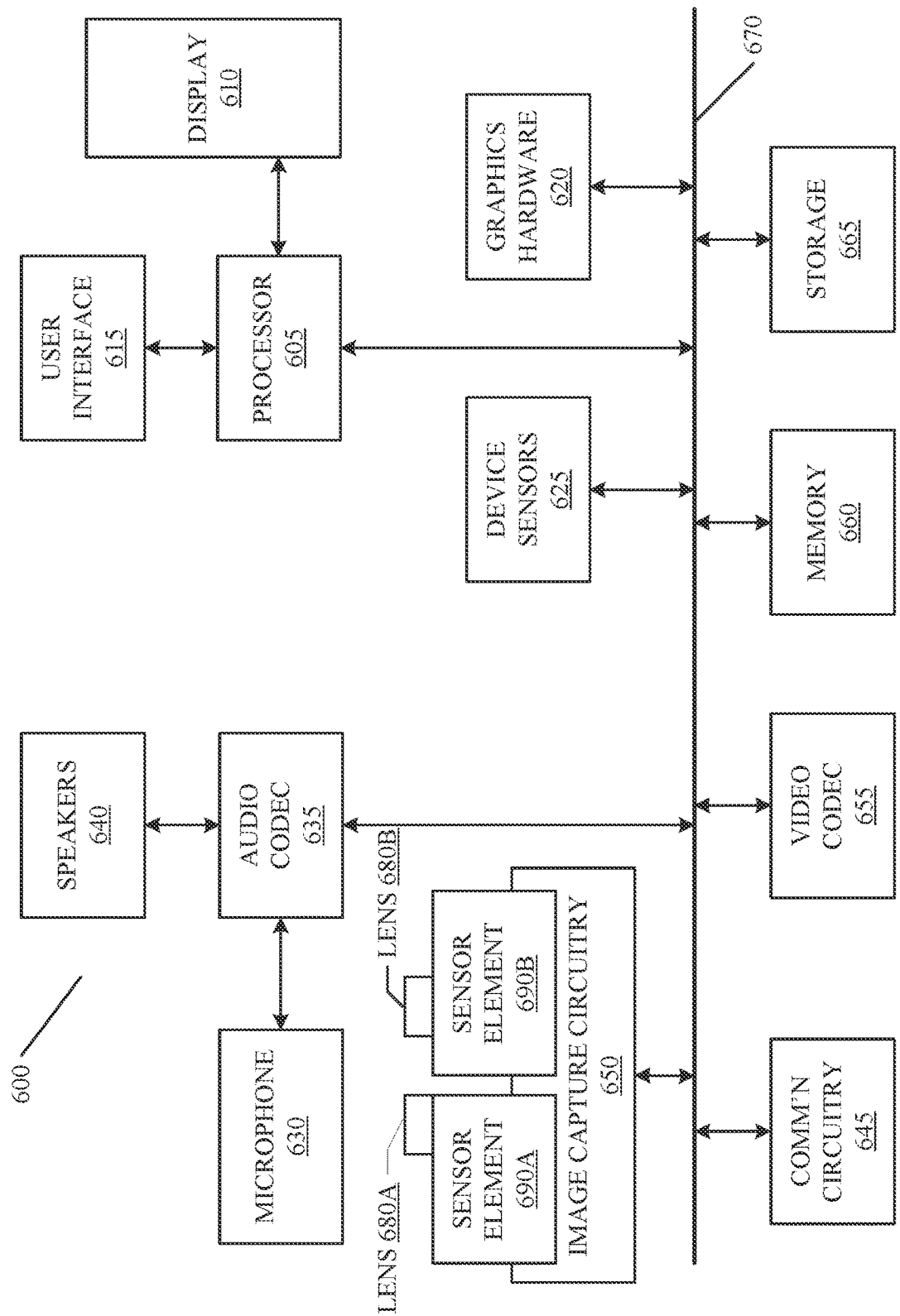
FIG. 6 shows, in block diagram form, a computer system in accordance with one or more embodiments.

Referring now to FIG. 6, a simplified functional block diagram of illustrative multifunction electronic device 600 is shown, according to one embodiment. Each of electronic devices may be a multifunctional electronic device or may have some or all of the described components of a multifunctional electronic device described herein. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec 635, speakers 640, communications circuitry 645, digital image capture circuitry 650 (e.g., including camera system), video codec(s) 655 (e.g., in support of digital image capture unit), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images as disclosed herein). Processor 605 may, for instance, drive display 610 and receive user input from user interface 615. User interface 615 may allow a user to interact with device 600. For example, user interface 615 can take a variety of forms, such as a button, keypad, dial, click wheel, keyboard, display screen and/or touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec 655 and/or processor 605 and/or graphics hardware 620, and/or a dedicated image processing unit or pipeline incorporated within circuitry 650. Images so captured may be stored in memory 660 and/or storage 665.

Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more nontransitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605, such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-4 or the arrangement of elements shown in FIGS. 1 and 5-6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A method for identifying a specular surface in a scene, comprising:
   at one or more processors:
      receiving an image of the scene;
      extracting, from the image, a set of natural features;
      generating, from the image, a set of synthesized mirrored features;
      determining one or more correspondences between the set of natural features and the set of synthesized mirrored features;
      identifying, based on the one or more correspondences, that the set of natural features comprises one or more features representing a specular surface in the scene, the identifying further comprising:
         identifying a first subset of natural features from the determined one or more correspondences;
         identifying a second subset of natural features from the determined one or more correspondences;
         determining that the first subset of natural features comprise a mirrored version of the second subset of natural features; and
         identifying that the first subset of natural features represents the specular surface in the scene by determining that the location of the first subset of natural features is farther from a device from which the image is captured than the second subset of natural features is from the device; and
      determining a location of the specular surface in the scene based on a location of the one or more features representing the specular surface in the scene.

2. The method of claim 1, wherein generating the set of synthesized mirrored features further comprises transforming one or more of the set of natural features by flipping one or more spatial bins of feature descriptors for each of the one or more of the set of natural features.

3. The method of claim 1, wherein generating the set of synthesized mirrored features further comprises:
   flipping at least a portion of the image along an axis; and
   obtaining feature descriptors for one or more of the set of synthesized mirrored features in the flipped portion of the image.

4. The method of claim 1, further comprising:
   performing pose estimation of the device from which the image is captured, based on the determined one or more correspondences to reduce the set of natural features; and
   determining the location of the specular surface in the scene based on the reduced set of natural features.

5. The method of claim 1, further comprising:
   performing a segmentation technique based on the determined one or more correspondences and the image of the scene; and
   determining a geometry of the specular surface based on the segmentation technique.

6. A non-transitory computer readable medium comprising computer readable code executable by one or more processors to:
   receive an image of the scene;
   extract, from the image, a set of natural features;
   generate, from the image, a set of synthesized mirrored features;
   determine one or more correspondences between the set of natural features and the set of synthesized mirrored features;
   identify, based on the one or more correspondences, that the set of natural features comprises one or more features representing a specular surface in the scene, the identification further comprising:
      identifying a first subset of natural features from the determined one or more correspondences;
      identifying a second subset of natural features from the determined one or more correspondences;
      determining that the first subset of natural features comprise a mirrored version of the second subset of natural features; and
      identifying that the first subset of natural features represents the specular surface in the scene by determining that the location of the first subset of natural features is farther from a device from which the image is captured than the second subset of natural features is from the device; and
   determine a location of the specular surface in the scene based on a location of the one or more features representing the specular surface in the scene.

7. The non-transitory computer readable medium of claim 6, wherein the computer readable code to generate the set of synthesized mirrored features further comprises computer readable code to transform one or more of the set of natural features by flipping one or more spatial bins of feature descriptors for each of the one or more of the set of natural features.

8. The non-transitory computer readable medium of claim 6, wherein the computer readable code to generate the set of synthesized mirrored features further comprises computer readable code to:
   flip at least a portion of the image along an axis; and
   obtain feature descriptors for one or more of the set of synthesized mirrored features in the flipped portion of the image.

9. The non-transitory computer readable medium of claim 6, further comprising computer readable code to:
   perform pose estimation of the device from which the image is captured, based on the determined one or more correspondences to reduce the set of natural features; and
   determine the location of the specular surface in the scene based on the reduced set of natural features.

10. The non-transitory computer readable medium of claim 6, further comprising computer readable code to:
   perform a segmentation technique based on the determined one or more correspondences and the image of the scene; and
   determine a geometry of the specular surface based on the segmentation technique.

11. A system comprising:
one or more processors; and
one or more computer readable media comprising computer readable code executable by the one or more processors to:
  receive an image of the scene;
  extract, from the image, a set of natural features;
  generate, from the image, a set of synthesized mirrored features;
  determine one or more correspondences between the set of natural features and the set of synthesized mirrored features;
  identify, based on the one or more correspondences, that the set of natural features comprises one or more features representing a specular surface in the scene, the identification further comprising:
    identifying a first subset of natural features from the determined one or more correspondences;
    identifying a second subset of natural features from the determined one or more correspondences;
    determining that the first subset of natural features comprise a mirrored version of the second subset of natural features; and
    identifying that the first subset of natural features represents the specular surface in the scene by determining that the location of the first subset of natural features is farther from a device capturing the image than the second subset of natural features is from the device; and
  determine a location of the specular surface in the scene based on a location of the one or more features representing the specular surface in the scene.

12. The system of claim 11, wherein the computer readable code to generate the set of synthesized mirrored features further comprises computer readable code to transform one or more of the set of natural features by flipping one or more spatial bins of feature descriptors for each of the one or more of the set of natural features.

13. The system of claim 11, further comprising computer readable code to:
  perform pose estimation of the device from which the image is captured, based on the determined one or more correspondences to reduce the set of natural features; and
  determine the location of the specular surface in the scene based on the reduced set of natural features.

14. The system of claim 11, further comprising computer readable code to:
  perform a segmentation technique based on the determined one or more correspondences and the image of the scene; and
  determine a geometry of the specular surface based on the segmentation technique.

* * * * *